US011073332B2

(12) United States Patent
Yalcin et al.

(10) Patent No.: US 11,073,332 B2
(45) Date of Patent: Jul. 27, 2021

(54) INDUCTION CONTROLLED COOLING

(71) Applicant: VESTEL ELEKTRONIK SANAYI ve TICARET A.S., Manisa (TR)

(72) Inventors: Ahmet Yalcin, Manisa (TR); Engin Findikli, Manisa (TR)

(73) Assignee: VESTEL ELECTRONIK SANAYI VE TICARET A.S., Manisa (TR)

( * ) Notice: Subject to any disclaimer, the term of this patent is extended or adjusted under 35 U.S.C. 154(b) by 12 days.

(21) Appl. No.: 16/137,776

(22) Filed: Sep. 21, 2018

(65) Prior Publication Data
US 2019/0093944 A1 Mar. 28, 2019

(30) Foreign Application Priority Data
Sep. 22, 2017 (EP) .................................... 17192673

(51) Int. Cl.
F25D 29/00 (2006.01)
F25D 31/00 (2006.01)
G01K 7/36 (2006.01)
H05B 6/06 (2006.01)

(52) U.S. Cl.
CPC ......... *F25D 29/006* (2013.01); *F25D 29/008* (2013.01); *F25D 31/005* (2013.01); *F25D 31/007* (2013.01); *G01K 7/36* (2013.01); *F25D 2331/803* (2013.01); *F25D 2400/36* (2013.01); *F25D 2700/16* (2013.01); *H05B 6/06* (2013.01)

(58) Field of Classification Search
CPC .. F25D 31/007; F25D 31/005; F25D 2400/36; F25D 2331/803; F25D 2700/16; F25D 11/00; F25D 17/02; F25D 29/00; F25D 2600/04; H05B 6/06
See application file for complete search history.

(56) References Cited

U.S. PATENT DOCUMENTS

| 5,255,981 | A | | 10/1993 | Schiessle et al. |
| 6,158,227 | A | * | 12/2000 | Seeley .................... G01K 1/14 340/585 |
| 9,967,924 | B2 | * | 5/2018 | Heczko ................... H05B 6/06 |
| 2001/0027684 | A1 | * | 10/2001 | Lotters .................. G01F 1/6847 73/204.27 |
| 2007/0242727 | A1 | * | 10/2007 | Hilgers .................. G01K 7/003 374/186 |
| 2017/0102181 | A1 | * | 4/2017 | Arjona Esteves ...... F25D 29/00 |

FOREIGN PATENT DOCUMENTS

| CN | 201996281 U | 10/2011 |
| JP | 1-308903 A | 12/1989 |
| WO | 20050116599 A1 | 12/2005 |

OTHER PUBLICATIONS

Applicant: Vestel Elektronik Sanayi ye Ticaret A.S., European Search Report, European Application No. 17192673.6; dated Feb. 28, 2018; 3 pp.

* cited by examiner

Primary Examiner — Frantz F Jules
Assistant Examiner — Lionel Nouketcha
(74) Attorney, Agent, or Firm — Tarolli, Sundheim, Covell & Tummino LLP

(57) ABSTRACT

A system for controlling cooling of a container in a household appliance includes a conducting wire adapted and configured to be placed in windings around the container, a monitor adapted to sense the inductance of the wire, and an indicator to signal to a user that the temperature of the container has reached a predetermined temperature value.

12 Claims, 2 Drawing Sheets

INDUCTION CONTROLLED COOLING

CROSS-REFERENCE TO RELATED APPLICATION

The present application claims priority under 35 U.S.C. § 119 from European Patent Application No. 17 192 673.6, filed 22 Sep. 2017, and entitled INDUCTION CONTROLLED COOLING, which is incorporated herein by reference in its entirety.

TECHNICAL FIELD

The present disclosure generally relates to induction controlled cooling. More specifically, an apparatus and a method for induction controlled cooling are disclosed herein. Moreover, a household appliance implementing the induction controlled cooling including an indicating mechanism is disclosed herein.

BACKGROUND

The present disclosure relates to a technique for preventing a glass bottle in a household appliance such as a refrigerator or freezer from being broken due to the beverage in the bottle reaching a frozen state. In order to cool the contents of the glass bottle in a short time, one option is to put the glass bottle into the freezing compartment of the refrigerator or directly into a freezer where the temperature is usually around minus twenty degrees Celsius. Exposing the glass bottle to such a low temperature for too long may cause the beverage in the glass bottle being frozen through and the glass being broken into small pieces. This event may harm the inside surface of the freezing compartment of the refrigerator or the freezer and also may lead to injuries when taking out the glass bottle. This problem is listed in the most 50 dangerous things in daily life.

Problem

The object is to provide a convenient way to quickly cool beverages without running the risk of the bottle breaking due to ice being formed in the bottle because the glass bottle is exposed to the low temperature for too long.

SUMMARY

A system for controlling cooling of a container in a household appliance, the system including a conducting wire adapted and configured to be placed in windings around the container, a monitor adapted to sense the inductance of the wire, and an indicator to signal to a user that the temperature of the container has reached a predetermined temperature value based on a change of the inductance of the wire placed around the container.

In other words, the proposed system is adapted and proposed for preventing a glass bottle filled with a beverage placed in a freezer from being broken. To this end, a conducting wire is wound around the glass bottle in the freezer. The proposed system is configured to calculate a target inductance value of the wire corresponding to a target beverage temperature selected by a user. The proposed system is configured to monitor the inductance of the wire and to notify the user that the target beverage temperature is reached when the wire reaches the target inductance value.

If the temperature of a wire forming a coil decreases, the length of the wire will decrease. A decreasing length of the wire leads to an increased inductance of the wire. In the proposed system, the user may enter a desired temperature value for the beverage when placing the bottle into the freezer and the system calculates the corresponding length difference of the wire and, from the calculated length difference, the final inductance value that the wire will have when the desired temperature of the beverage is reached. When the desired temperature is reached, the system may notify the user. In this way, it can be ensured that the beverage will not freeze and not break the glass due to the thermal expansion taking place.

The proposed system is adapted and configured to determine a target inductance value of the wire placed in windings around the container corresponding to a target beverage temperature selected by the user.

The proposed system is adapted and configured to monitor the inductance of the wire placed in windings around the container and to notify the user that the target beverage temperature is reached when the wire reaches the target inductance value.

The wire of the proposed system is either a loose wire adapted and configured to be placed in windings around the container by the user, or the wire is arranged in windings provided in a sleeve or sheath adapted and configured to accommodate the container at least partially in a snug fit.

The proposed system includes a controller adapted and configured to determine the inductance of the wire placed in windings around the container when the container has a first temperature, receive an entry of the target beverage temperature by the user, determine the target inductance value of the wire placed in windings around the container corresponding to the target beverage temperature selected by the user, and signal to the user once the target inductance value of the wire is sensed by the monitor, that the target beverage temperature selected by the user has been reached.

If the temperature of the container which is in a thermally conducting contact with the wire decreases, the length of the wire placed in windings around the container also decreases. The decreasing length of the wire leads to an increased inductance of the wire.

In the proposed system, the user may enter a desired temperature value for the beverage when placing the bottle into the freezer and the system calculates the corresponding length difference of the wire and, from the calculated length difference, the final inductance value that the wire placed in windings around the container will have when the desired temperature of the beverage is reached. When the desired temperature is reached, the final inductance value that the wire will also be reached. This may be sensed by the monitor and the indicator of the system may signal a notification the user. In this way, it can be ensured that the beverage will not be cooled to a degree that it turns to ice. Consequently, the liquid beverage will not break the glass of the container or rupture the container due to the thermal expansion taking place.

A predefined space or compartment in the refrigerator/freezer is provided for placing the glass bottle therein. This compartment is isolated initially and has a temperature value of around e.g. 4° C. There is a well fit wire placed around the container. The wire covers the container at least partially and is in a thermally conducting connection with the container. The system controller continuously or intermittently checks the inductance of the wire which changes with the temperature of the container changing.

When the container cools down in the refrigerator/freezer, the length of the wire will decrease. As a consequence, the inductance value of the wire increases. The formula for the change in length of a wire depending on the temperature difference and its thermal expansion coefficient reads as follows:

$$dL = L1 * alpha * (T2-T1) \quad (1)$$

$$L2 = L1 + dL \quad (2)$$

where
dL is the length difference of the wire resulting from the thermal contraction of the wire from a higher to a lower temperature
T1 is the initial temperature of the wire [e.g.: 4° C.]
T2 is the final temperature of the wire and the beverage in the container [e.g.: 0° C.]
L1 is the initial wire length at the initial temperature of the wire T1 [(e.g. 100 mm)]
L2 is the final wire length at the final temperature of the wire T2
alpha is the thermal expansion coefficient of the wire [e.g.: $16.7 * 10^{-6}$ for Copper Ahoy C17200 (Beryllium-Copper)]

In the proposed system, the user will optionally select/enter the type of beverage to be cooled and select/enter into the system controller the final temperature value T2 that s/he would like the beverage in the container to reach. In the proposed system, the most common beverages' exact freezing temperatures may be pre-stored in the system controller. In case a temperature value lower than or equal to the freezing temperature of the respective beverage is entered, the system controller will reject it and ask to enter a new/higher temperature value. Thus, system will ensure that the beverage will not freeze and will not break the glass or rupture the container due to thermal expansion of the beverage liquid turning to ice.

If two materials are touching each other they will meet an equilibrium thermal point. In the proposed system, this point is the final temperature value T2 of the wire and the beverage in the container around which the wire is placed in windings.

After the desired final temperature of the beverage T2 has been entered into the system controller, the system controller determines the length difference of the wire after the thermal contraction dL by using the length difference formula (formula (1) supra). By adding L1+dL=L2 (formula (2) supra) the system controller determines the final length L2 of the wire after its thermal contraction. The system controller uses the final length L2 of the wire in the inductance formula (formula (3) below) to determine the final inductance I2 value that the wire will have starting form a first inductance I1 at a higher initial temperature T1 (e.g. 4° C. or room temperature) after its thermal contraction due to the cooling to the final temperature T2 of the wire and the beverage in the container.

$$I2 = k * n^2 * S / L2 \quad (3)$$

where
I2 is the final inductance value that the wire will have after its thermal expansion due to the cooling
k is a constant value
n is the number of turns of the wire around the container
S is the section area of the container where the wire is wound around the container
L2 is the final wire length at the final temperature of the wire T2

In formula (3) supra, all the values are constant except the length L2 of the wire due to its thermal contraction from the cooling to the final temperature T2 of the wire and the beverage in the container.

In the proposed system, by carrying out the above computations, the system controller determines what will be the final inductance value I2 of the wire after its thermal contraction due to the cooling to the user defined beverage temperature value. Once the monitor senses the predetermined inductance value L2 of the wire indicative of the user defined beverage temperature value T2 the indicator signals to the user that the temperature of the container has reached a predetermined value.

Thereby, the proposed system warns/alerts the user that the beverage temperature has reached the defined value. The user can then remove the container/glass bottle from the household appliance. Effectively, this avoids the glass bottle breaking into pieces.

BRIEF DESCRIPTION OF THE DRAWINGS

In the following, the present disclosure will further be described with reference to exemplary implementations illustrated in the figures, in which.

DETAILED DESCRIPTION

Figure 1:
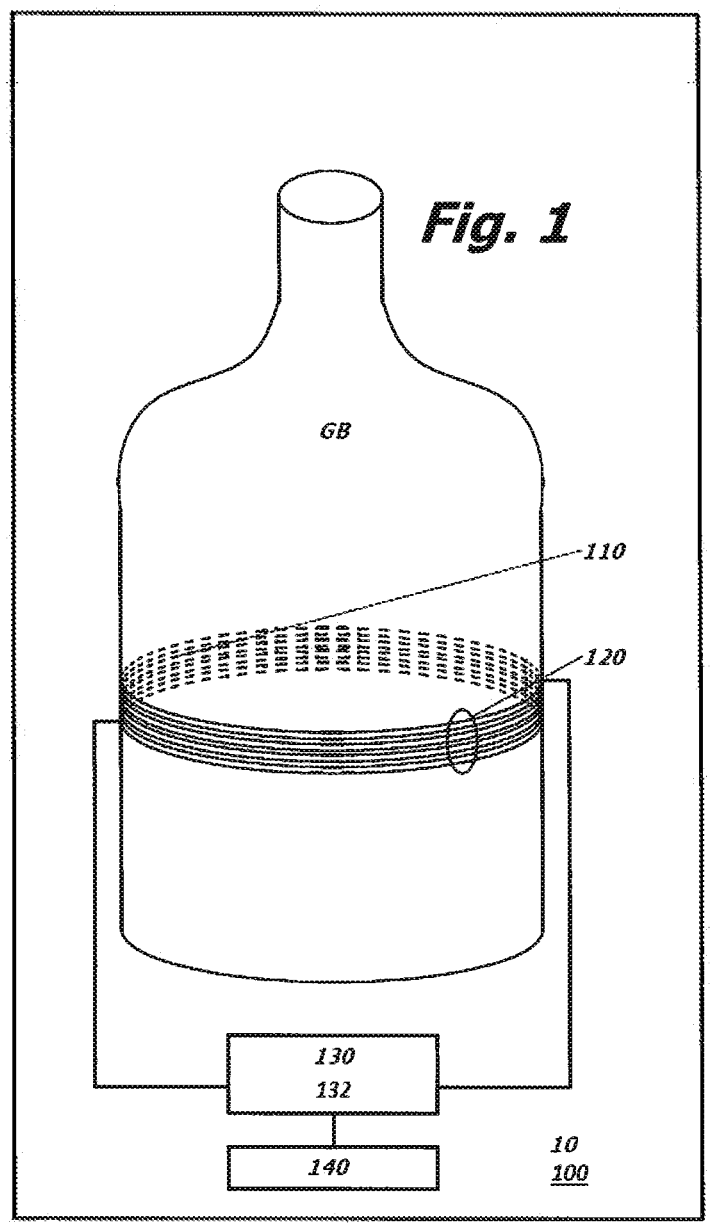
FIG. 1 illustrates a schematic overview of a household appliance incorporating the system according to the present disclosure.

FIG. 1 illustrates a schematic overview of a household appliance 10 incorporating a system 100 for controlling cooling of a container or glass bottle GB in the household appliance (refrigerator, freezer or the like). The system 100 includes a conducting wire 110 adapted and configured to be placed in windings 120 around the container GB. The system 100 further includes a monitor 130 adapted to sense the inductance of the wire 110. In addition, the system 100 includes an indicator 140 to signal to a user that the temperature of the container has reached a predetermined temperature value based on a change of the inductance of the wire 110 placed around the container GB.

Thereby, the system 100 can prevent the glass bottle GB filled with a beverage placed in the freezer from being broken when cooling down in an uncontrolled fashion. The conducting wire 110 is wound around the glass bottle GB in the freezer. The monitor 130 of the system 100 includes a controller configured to calculate a target inductance value of the wire corresponding to a selected target beverage temperature. The monitor 130 of the system 100 is configured to monitor the inductance of the wire 110 at the beginning of the cooling process, i.e. when the container GB has a first temperature T1, e.g. room temperature, where the inductance of the wire is L1 and to notify the user that the target beverage temperature T2 is reached when the wire reaches the target inductance value L2.

In the embodiment illustrated in FIG. 1, the wire is a loose wire to be placed in windings around the container GB by the user. In an alternative not specifically shown in the drawings, the wire 110 is arranged in windings provided in a sleeve or sheath made from plastic material (e.g. polyethlyen or rubber) to accommodate the container at least partially in a snug fit.

In the system 100, the monitor 130 includes an electronic controller to determine the inductance of the wire 110 placed in windings around the container GB when the container GB has a first temperature which is above the freezing temperature of the beverage or liquid in the container GB (e.g. room temperature). The electronic controller 132 is adapted to receive an entry of the target beverage temperature by the user. This entry can be a keypad in the household appliance 100 or a keypad of a mobile device endowed with a software program (e.g. an App) and connected wirelessly to the household appliance 100. The electronic controller 132 is adapted to determine the target inductance value of the wire placed in windings around the container corresponding to the target beverage temperature selected entered by the user. The electronic controller 132 signals to the user once the target inductance value of the wire is sensed by the monitor, that the target beverage temperature selected by the user has been reached.

Figure 2:
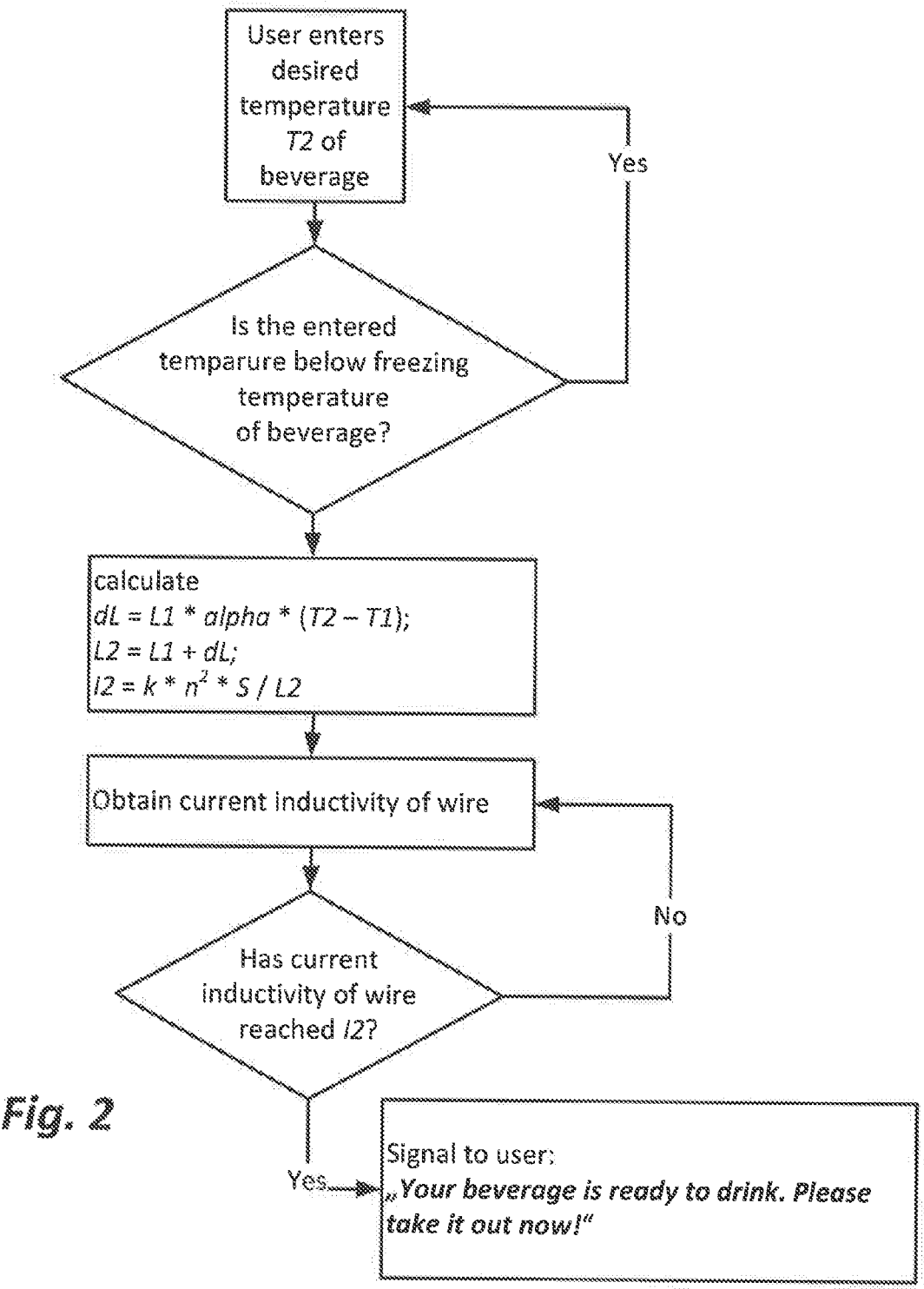
FIG. 2 illustrates a flow diagram corresponding to a method which may be performed by the controller of the system according to the present disclosure of FIG. 1.

A flow diagram shown in FIG. 2 illustrated the method which is performed by the controller of the system according to the present disclosure of FIG. 1. This method of controlling cooling of the container GB in the household appliance includes placing a conducting wire in windings around the container, monitoring the inductance of the wire, and signaling that the temperature of the container has reached a predetermined temperature value based on a change of the inductance of the wire. More specifically, this method includes calculating a target inductance value of the wire corresponding to a target beverage temperature selected, and a desired temperature value for the beverage is entered when placing the bottle into the freezer. After calculating a corresponding length difference of the wire, the final inductance value that the wire will have when the desired temperature of the beverage is reached will be used to compare it with the current inductance value. Once the current inductance of the wire has reached final inductance value, a signal to user will be issued: "Your beverage is ready to drink. Please take it out now!"

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A system for controlling cooling of a container in a household appliance, the system including:
  a conducting wire adapted and configured to be placed in windings around the container; and
  a monitor adapted to:
    receive an entry of a target temperature value for a beverage by a user,
    calculate a target inductance of the wire corresponding to the received target temperature value, and
    monitor an inductance of the wire;
  wherein the system is configured to issue a notification that a temperature of the container has reached the target temperature value when the monitored inductance of the wire reaches the target inductance.

2. The system of claim 1, wherein the length of the wire placed in windings around the container decreases when a temperature of the wire decreases, and the decreasing length of the wire leads to an increased inductance of the wire, wherein the target temperature value for the beverage is to be entered when placing the container into the household appliance, and
  wherein the monitor is configured to calculate a corresponding length difference of the wire and, from the calculated length difference, the target inductance that the wire will have when the target temperature value is reached.

3. The system of claim 2, wherein the wire is:
  a loose wire adapted and configured to be placed in windings around the container by the user, or
  arranged in windings provided in a sleeve or sheath adapted and configured to accommodate the container at least partially in a snug fit.

4. The system of claim 2, wherein the household appliance comprises:
  a predefined space or compartment adapted and configured for placing the container therein,
  wherein the wire is adapted and configured to:
    be well fit placed around the container
    cover the container at least partially and be in a thermally conducting connection with the container, and
    wherein the monitor continuously or intermittently checks the inductance of the wire which changes with the temperature of the container changing.

5. The system of claim 4, wherein the monitor is further adapted and configured to receive:
  an optional user entry of beverage to be cooled, and
  a user entry of the target temperature value that the beverage in the container is to reach, and/or wherein the most common beverages' exact freezing temperatures are pre-stored in the system, and in case a temperature value lower than or equal to the freezing temperature of the respective beverage, the system is configured to reject this entry and demand the entry of a new/higher temperature value.

6. The system of claim 5, wherein the system alerts the user in an audible, visible or tactile warning that the temperature has reached the target temperature value.

7. The system of claim 1, wherein the wire is:
  a loose wire adapted and configured to be placed in windings around the container by the user, or
  arranged in windings provided in a sleeve or sheath adapted and configured to accommodate the container at least partially in a snug fit.

8. The system of claim 1, wherein the household appliance comprises:
  a predefined space or compartment adapted and configured for placing the container therein,
  wherein the wire is adapted and configured to:
    be well fit placed around the container,
    cover the container at least partially and be in a thermally conducting connection with the container, and wherein the monitor continuously or intermittently checks the inductance of the wire which changes with the temperature of the container changing.

9. The system of claim 8, wherein the monitor is further adapted and configured to receive:
  an optional user entry of beverage to be cooled, and
  a user entry of the target temperature value that the beverage in the container is to reach, and/or wherein the most common beverages' exact freezing temperatures are pre-stored in the system, and in case a temperature value lower than or equal to the freezing temperature of the respective beverage, the system is configured to reject this entry and demand the entry of a new/higher temperature value.

10. The system of claim 9, wherein the system alerts the user in an audible, visible or tactile warning that the temperature has reached the target temperature value.

11. A method of controlling cooling of a container in a household appliance, the method including:
   placing a conducting wire in windings around the container;
   receiving an entry of a target temperature value for a beverage, the target temperature value for the beverage being entered when placing the container into the household appliance;
   calculating a corresponding length difference of the wire and, from the calculated length difference, a target inductance that the wire will have when the target temperature value is reached;
   monitoring the inductance of the wire; and
   signaling that a temperature of the container has reached the target temperature value when the monitored inductance of the wire reaches the target inductance.

12. A system for controlling cooling of a container in a household appliance, the system including:
   a conducting wire adapted and configured to be placed in windings around the container,
   an inductance sensor adapted to sense the inductance of the wire,
   wherein the length of the wire placed in windings around the container decreases when the temperature of the wire decreases, and the decreasing length of the wire leads to an increased inductance of the wire,
   wherein a desired temperature value for the beverage is to be entered when placing the container into the household appliance, and the system calculates the corresponding length difference of the wire, from the calculated length difference, the final inductance value that the wire will have when the desired temperature of the beverage is reached, and
   wherein when the beverage has reached the desired temperature, the system is adapted and configured to issue a notification to a user that beverage has reached the desired temperature.

* * * * *